US008225595B2

(12) United States Patent
Garimella et al.

(10) Patent No.: US 8,225,595 B2
(45) Date of Patent: Jul. 24, 2012

(54) APPARATUS, SYSTEM, AND METHOD FOR ESTIMATING AN NOX CONVERSION EFFICIENCY OF A SELECTIVE CATALYTIC REDUCTION CATALYST

(75) Inventors: Phanindra Garimella, Bloomington, IN (US); Andy Osburn, Nashville, IN (US); John N. Chi, Raleigh, NC (US); Joan M. Wills, Nashville, IN (US)

(73) Assignee: Cummins IP, Inc., Minneapolis, MN (US)

(*) Notice: Subject to any disclaimer, the term of this patent is extended or adjusted under 35 U.S.C. 154(b) by 335 days.

(21) Appl. No.: 12/632,646

(22) Filed: Dec. 7, 2009

(65) Prior Publication Data
US 2010/0242440 A1    Sep. 30, 2010

Related U.S. Application Data

(60) Provisional application No. 61/120,297, filed on Dec. 5, 2008.

(51) Int. Cl.
*F01N 3/00* (2006.01)
(52) U.S. Cl. ............... 60/277; 60/274; 60/276; 60/295; 60/301
(58) Field of Classification Search ............ 60/274, 60/276, 277, 285–287, 295–301
See application file for complete search history.

(56) References Cited

U.S. PATENT DOCUMENTS

| | | |
|---|---|---|
| 5,552,128 A | 9/1996 | Chang et al. |
| 5,809,775 A | 9/1998 | Tarabulski et al. |
| 6,109,024 A | 8/2000 | Kinugasa et al. |
| 6,125,629 A | 10/2000 | Patchett |
| 6,182,443 B1 | 2/2001 | Jarvis et al. |
| 6,266,955 B1 | 7/2001 | Liang et al. |
| 6,269,633 B1 | 8/2001 | van Nieuwstadt et al. |
| 6,295,809 B1 | 10/2001 | Hammerle et al. |
| 6,311,484 B1 | 11/2001 | Roth et al. |
| 6,375,828 B2 | 4/2002 | Ando et al. |

(Continued)

FOREIGN PATENT DOCUMENTS
EP    1129278 B1    8/2003
(Continued)

OTHER PUBLICATIONS

PCT/US2009/042419 International Search Report and Written Opinion, Jan. 27, 2010.

(Continued)

*Primary Examiner* — Thomas Denion
*Assistant Examiner* — Jesse Bogue
(74) *Attorney, Agent, or Firm* — Kunzler Law Group, PC (57) ABSTRACT

According to one exemplary embodiment, an apparatus is disclosed for estimating an $NO_x$ conversion efficiency of an SCR catalyst. The apparatus includes a catalyst degradation module for determining an SCR catalyst degradation factor and a $NO_x$ concentration module for determining an SCR catalyst inlet $NO_x$ concentration based on an interpretation of at least one $NO_x$ detector signal. Additionally, the apparatus includes an $NH_3$ concentration module for determining an SCR catalyst inlet $NH_3$ concentration, a temperature module for determining an SCR catalyst bed temperature of the at least one SCR catalyst, and a space velocity (SV) module for determining an exhaust gas SV for the SCR catalyst. A $NO_x$ conversion efficiency module calculates a $NO_x$ conversion efficiency value based at least partially on the SCR catalyst degradation factor, the SCR catalyst inlet $NO_x$ concentration, the SCR catalyst inlet $NH_3$ concentration, the exhaust gas SV, and the SCR catalyst bed temperature.

22 Claims, 4 Drawing Sheets

U.S. PATENT DOCUMENTS

| | | | |
|---|---|---|---|
| 6,415,602 | B1 | 7/2002 | Patchett et al. |
| 6,446,430 | B1 | 9/2002 | Roth et al. |
| 6,546,720 | B2 | 4/2003 | van Nieuwstadt |
| 6,581,374 | B2 | 6/2003 | Patchett et al. |
| 6,662,553 | B2 | 12/2003 | Patchett et al. |
| 6,701,707 | B1* | 3/2004 | Upadhyay et al. ............... 60/277 |
| 6,713,030 | B1 | 3/2004 | Chandler et al. |
| 6,742,326 | B2 | 6/2004 | Xu et al. |
| 6,742,330 | B2 | 6/2004 | Genderen |
| 6,829,885 | B2 | 12/2004 | Surnilla et al. |
| 6,882,929 | B2 | 4/2005 | Liang et al. |
| 6,892,530 | B2 | 5/2005 | Montreuil et al. |
| 6,901,745 | B2 | 6/2005 | Schnaibel et al. |
| 6,928,806 | B2 | 8/2005 | Tennison et al. |
| 6,981,368 | B2 | 1/2006 | van Nieuwstadt et al. |
| 6,993,900 | B2 | 2/2006 | Upadhyay et al. |
| 7,017,389 | B2 | 3/2006 | Gouma |
| 7,063,642 | B1 | 6/2006 | Hu et al. |
| 7,093,427 | B2 | 8/2006 | van Nieuwstadt et al. |
| 7,113,835 | B2 | 9/2006 | Boyden et al. |
| 7,117,046 | B2 | 10/2006 | Boyden et al. |
| 7,134,273 | B2* | 11/2006 | Mazur et al. ..................... 60/286 |
| 7,150,145 | B2 | 12/2006 | Patchett et al. |
| 7,168,243 | B2 | 1/2007 | Endicott et al. |
| 7,178,328 | B2 | 2/2007 | Solbrig |
| 7,204,081 | B2 | 4/2007 | Yasui et al. |
| 7,213,395 | B2 | 5/2007 | Hu et al. |
| 7,263,825 | B1 | 9/2007 | Wills et al. |
| 7,320,781 | B2 | 1/2008 | Lambert et al. |
| 7,332,135 | B2 | 2/2008 | Gandhi et al. |
| 7,485,272 | B2 | 2/2009 | Driscoll et al. |
| 7,603,846 | B2 | 10/2009 | Lueders et al. |
| 7,628,009 | B2 | 12/2009 | Hu et al. |
| 7,631,490 | B2 | 12/2009 | Colignon |
| 7,650,746 | B2 | 1/2010 | Hu et al. |
| 7,685,813 | B2 | 3/2010 | McCarthy, Jr. |
| 7,802,419 | B2 | 9/2010 | Doring |
| 7,832,200 | B2 | 11/2010 | Kesse et al. |
| 7,861,518 | B2 | 1/2011 | Federle |
| 7,892,508 | B2 | 2/2011 | Katoh |
| 7,997,070 | B2 | 8/2011 | Yasui et al. |
| 8,020,374 | B2 | 9/2011 | Walz et al. |
| 8,061,126 | B2 | 11/2011 | Gady et al. |
| 8,074,445 | B2 | 12/2011 | Ofoli et al. |
| 2002/0044897 | A1 | 4/2002 | Kakwani et al. |
| 2003/0177766 | A1 | 9/2003 | Wang |
| 2003/0182935 | A1 | 10/2003 | Kawai et al. |
| 2004/0098968 | A1* | 5/2004 | van Nieuwstadt et al. ...... 60/277 |
| 2004/0112046 | A1 | 6/2004 | Tumale et al. |
| 2004/0128982 | A1* | 7/2004 | Patchett et al. ................. 60/274 |
| 2005/0282285 | A1 | 12/2005 | Radhamohan et al. |
| 2006/0086080 | A1 | 4/2006 | Katogi et al. |
| 2006/0130458 | A1 | 6/2006 | Solbrig |
| 2006/0155486 | A1 | 7/2006 | Walsh et al. |
| 2006/0212140 | A1 | 9/2006 | Brackney |
| 2007/0044456 | A1 | 3/2007 | Upadhyay et al. |
| 2007/0137181 | A1* | 6/2007 | Upadhyay et al. ............... 60/286 |
| 2007/0137184 | A1 | 6/2007 | Patchett et al. |
| 2007/0214777 | A1 | 9/2007 | Allansson et al. |
| 2007/0295003 | A1 | 12/2007 | Dingle et al. |
| 2008/0022658 | A1 | 1/2008 | Viola et al. |
| 2008/0022659 | A1 | 1/2008 | Viola et al. |
| 2008/0060348 | A1 | 3/2008 | Robel et al. |
| 2008/0066455 | A1 | 3/2008 | Viola et al. |
| 2008/0250774 | A1 | 10/2008 | Solbrig |
| 2008/0250778 | A1* | 10/2008 | Solbrig ............................ 60/301 |
| 2008/0295499 | A1 | 12/2008 | Driscoll et al. |
| 2009/0272099 | A1 | 11/2009 | Garimella et al. |
| 2009/0272101 | A1 | 11/2009 | Wills et al. |
| 2009/0272104 | A1 | 11/2009 | Garimella et al. |
| 2009/0272105 | A1 | 11/2009 | Chi et al. |
| 2009/0301066 | A1 | 12/2009 | Sindano et al. |
| 2010/0024390 | A1 | 2/2010 | Wills et al. |
| 2010/0024393 | A1 | 2/2010 | Chi et al. |
| 2010/0024397 | A1 | 2/2010 | Chi et al. |
| 2010/0028230 | A1 | 2/2010 | Gady et al. |
| 2010/0229531 | A1 | 9/2010 | Chi et al. |
| 2010/0275583 | A1 | 11/2010 | Farrell et al. |
| 2011/0058999 | A1 | 3/2011 | Ettireddy et al. |
| 2011/0262329 | A1 | 10/2011 | Ofoli et al. |

FOREIGN PATENT DOCUMENTS

| | | |
|---|---|---|
| EP | 1338562 | 8/2003 |
| EP | 1083979 B1 | 6/2004 |
| EP | 1431533 | 6/2004 |
| EP | 1339955 B1 | 8/2005 |
| EP | 1609977 A2 | 12/2005 |
| EP | 1672192 A1 | 6/2006 |
| EP | 1712764 A1 | 10/2006 |
| JP | 10118492 A | 5/1998 |
| JP | 2002327617 | 11/2002 |
| JP | 2004100700 | 4/2004 |
| JP | 2007255367 | 10/2007 |
| KR | 1020010043138 | 5/2001 |
| KR | 1020030034139 | 5/2003 |
| KR | 1020080030163 A | 4/2008 |
| KR | 1020100061145 | 11/2008 |
| WO | 9955446 | 11/1999 |
| WO | 0214657 A1 | 2/2002 |
| WO | 2004000443 A1 | 12/2003 |
| WO | 2006000877 A3 | 1/2006 |
| WO | 2007066502 A1 | 6/2007 |
| WO | 2007014649 A1 | 8/2007 |
| WO | 2008009940 A2 | 1/2008 |

OTHER PUBLICATIONS

PCT/US2009/042412 International Search Report and Written Opinion, Dec. 16, 2009.
PCT/US2009/042321 International Search Report and Written Opinion, Dec. 14, 2009.
PCT/US2009/042335 International Search Report and Written Opinion, Dec. 14, 2009.
PCT/US2009/042330 International Search Report and Written Opinion, Dec. 17, 2009.
PCT/US2009/042340 International Search Report and Written Opinion, Dec. 16, 2009.
U.S. Appl. No. 12/433,600 Notice of Allowance received Nov. 14, 2011.
U.S. Appl. No. 12/112,500 Office Action received Apr. 15, 2011.
U.S. Appl. No. 12/112,500 Notice of Allowance received Sep. 29, 2011.
U.S. Appl. No. 12/112,622 Office Action received Mar. 3, 2011.
U.S. Appl. No. 12/112,622 Notice of Allowance received Aug. 5, 2011.
U.S. Appl. No. 12/112,678 Office Action received Feb. 7, 2011.
U.S. Appl. No. 12/112,678 Final Office Action received Jul. 22, 2011.
U.S. Appl. No. 12/112,678 Office Action received Sep. 30, 2011.
U.S. Appl. No. 12/112,795 Office Action received Sep. 20, 2011.
U.S. Appl. No. 12/433,705 Office Action received Nov. 8, 2011.
U.S. Appl. No. 12/433,767 Office Action received Oct. 26, 2011.
U.S. Appl. No. 12/433,730 Office Action received Oct. 7, 2011.
PCT/US2009/042406 International Search Report and Written Opinion, Dec. 18, 2009.
U.S. Appl. No. 12/433,586 Office Action received Oct. 24, 2011.
U.S. Appl. No. 12/112,678 Notice of Allowance received Feb. 2, 2012.
Control of a Urea SCR Catalytic Converter System for a Mobile Heavy Duty Diesel Engine—C.M. Schar, C.H. Onder, H.P. Geering and M. Elsener—SAE 200301-0776, Mar. 6, 2003.
PCT/US2009/042409, International Search Report and Written Opinion, Nov. 25, 2009.
PCT/US2009/042423, International Search Report and Written Opinion, Nov. 27, 2009.
P.R. Ettireddy et al. "Surface characterization studies of TiO2 supported manganese oxide catalysts for low temperature SCR of NO with NH3" Applied Catalysis B, 76 (2007).
D.A Pena, et al. "Identification of Surface Species on Titania-Supported Manganese, Chromium, and Copper Oxide Low-Temperature SCR Catalysts": Journal of Physical Chemistry B, 108 (2004) 9927-9936.
U.S. Appl. No. 12/433,586 Office Action received Mar. 20, 2012.

U.S. Appl. No. 12/632,628 Office Action received Apr. 30, 2012.
U.S. Appl. No. 12/112,795 Notice of Allowance received Mar. 2, 2012.
U.S. Appl. No. 12/433,705 Notice of Allowance received Apr. 2, 2012.
U.S. Appl. No. 12/433,767 Office Action received Apr. 6, 2012.
PCT/US2011/033767 International Search Report and Written Opinion, Feb. 8, 2012.
PCT/US2010/048502, International Search Report and Written Opinion, May 23, 2011.
PCT/US2009/067023, International Search Report and Written Opinion, Jul. 13, 2010.
PCT/US2009/067020, International Search Report and Written Opinion, Jul. 13, 2010.

* cited by examiner

APPARATUS, SYSTEM, AND METHOD FOR ESTIMATING AN NOX CONVERSION EFFICIENCY OF A SELECTIVE CATALYTIC REDUCTION CATALYST

CROSS-REFERENCE TO RELATED APPLICATION

This application claims the benefit of U.S. Provisional Patent Application No. 61/120,297, filed Dec. 5, 2008, which is incorporated herein by reference.

FIELD

This invention relates to controlling nitrogen oxides ($NO_x$) emissions for internal combustion engines, and more particularly to apparatus, systems and methods for estimating $NO_x$ conversion efficiencies of selective catalytic reduction (SCR) catalysts.

BACKGROUND

Emissions regulations for internal combustion engines have become more stringent over recent years. The regulated emissions of $NO_x$ and particulates from internal combustion engines are low enough that in many cases the emissions levels cannot be met with improved combustion technologies. Therefore, the use of aftertreatment systems on engines to reduce emissions is increasing. For reducing $NO_x$ emissions, $NO_x$ reduction catalysts, including selective catalytic reduction (SCR) systems, are utilized to convert $NO_x$ (NO and $NO_2$ in some fraction) to $N_2$ and other compounds. SCR systems implement a reductant, typically ammonia, to reduce the $NO_x$. Currently available SCR systems can produce high $NO_x$ conversion rates allowing the combustion technologies to focus on power and efficiency. However, currently available SCR systems also suffer from a few drawbacks.

SCR systems generate ammonia to reduce the $NO_x$. When the proper amount of ammonia is available at the SCR catalyst under the proper conditions, the ammonia is utilized to reduce $NO_x$. However, if the reduction reaction rate is too slow, or if there is excess ammonia in the exhaust, ammonia can slip out the exhaust pipe. Ammonia is an extreme irritant and an undesirable emission, and slips of even a few tens of ppm are problematic. Additionally, due to the undesirability of handling pure ammonia, many systems utilize an alternate compound such as urea, which vaporizes and decomposes to ammonia in the exhaust stream. Presently available SCR systems treat injected urea as injected ammonia, and do not account for the vaporization and hydrolysis of urea to component compounds such as ammonia and isocyanic acid. As a result, the urea can decompose to ammonia downstream of the SCR causing ammonia slip, and less ammonia may be available for $NO_x$ reduction than the control mechanism estimates causing higher $NO_x$ emissions at the tailpipe.

SCR systems that utilize urea dosing to generate ammonia depend upon the real-time delivery of urea to the SCR catalyst as engine $NO_x$ emissions emerge. Urea dosers have relatively slow physical dynamics compared to other chemical injectors such as hydrocarbon injectors. Therefore, urea doser dynamics can substantially affect an SCR controls system.

Some currently available SCR systems account for the dynamics of the urea dosing and the generally fast transient nature of the internal combustion engine by utilizing the inherent ammonia storage capacity of many SCR catalyst formulations.

One currently available method introduces a time delay at the beginning of an engine $NO_x$ spike before urea dosing begins (or ramps up), and a time delay after the $NO_x$ spike before urea dosing ends (or ramps down). Ordinarily, and engine $NO_x$ spike will cause a temperature increase in the exhaust gas and SCR catalyst, causing stored ammonia in the catalyst to release. This is especially true when engine power output is used as a substitute for directly estimating engine $NO_x$ emissions. The ammonia release provides ammonia for reducing engine out $NO_x$ while delaying urea injection prevents excess ammonia from slipping out the exhaust. On the $NO_x$ decrease, normally the temperature of the engine exhaust and SCR catalyst decrease, and therefore continued urea injection (the delay before ramping down urea injection) provides ammonia to store on the SCR catalyst and recharge the catalyst.

In many ordinary circumstances, the time delay method causes desirable results in the SCR catalyst. However, in some cases the time delay method can produce undesirable results and even responses that are opposite from an optimal response. For example, a decrease in EGR fraction for any reason causes an engine out $NO_x$ spike with a decrease in exhaust temperature. In the time delay system utilizing engine-out power as a substitute for $NO_x$ emissions, the change will likely be ignored and a standard amount of urea injected causing an increase in $NO_x$ emissions. In a time delay system that recognizes the engine out $NO_x$ spike, the system delays injecting urea to create ammonia, and the lower temperature on the SCR catalyst reduces the amount of ammonia released from the catalyst to reduce $NO_x$ resulting in a $NO_x$ emissions increase. At the end of the $NO_x$ spike event, the exhaust temperature increases (from restoration of the designed EGR fraction) while the $NO_x$ emissions decreases. The SCR catalyst ejects ammonia from the reduced storage capacity while the urea injector continues to add ammonia to the system without $NO_x$ available for reduction. Therefore, the system can slip significant amounts of ammonia on the down cycle.

Other currently available systems determine whether the SCR catalyst is at an ammonia storing (adsorption) or ammonia ejecting (desorption) temperature. When the SCR catalyst is storing ammonia, the system injects urea until the catalyst is full. When the SCR catalyst is ejecting ammonia, the system halts injection and allows stored ammonia to release and reduce $NO_x$. Presently available systems tracking the SCR catalyst temperature suffer from a few drawbacks. For example, the amount of ammonia stored on the SCR catalyst varies with temperature, while presently available systems assume a storage amount below a specified temperature, and zero storage above the specified temperature. Therefore, the controls may toggle significantly around the specified temperature, significantly overestimating ammonia storage capacity below the specified temperature, and significantly underestimating ammonia storage capacity above the specified temperature. Such systems utilize the "normalized stoichiometric ratio" (NSR) to determine baseline urea injection, but do not account for variances in the $NO_x$ composition and $NH_3$ to isocyanic acid ratio of the urea when determining the NSR. Further, such systems do not account for the incomplete vaporization and hydrolysis of urea that occurs in many systems and may therefore not inject sufficient urea to reduce $NO_x$ and/or provide the desired ammonia for storage.

Furthermore, present methods of dosing the SCR catalyst do not adequately account for degradation of the SCR catalyst over the life-cycle of the device. Models of the reductant storage capacity of the SCR catalyst implemented initially may not be applicable over time. Thermal stresses in the exhaust system may reduce adsorption sites in the SCR catalyst for reductant storage. Present control methods that overestimate the reductant storage capacity of the SCR catalyst can cause reductant slip. Conversely, control methods that implement conservative derate schemes to ensure that ammonia slip is limited over time suffer from the degraded efficiency of the SCR catalyst.

SUMMARY

The subject matter of the present invention has been developed in response to the present state of the art, and in particular, in response to the problems and needs in the art that have not yet been fully solved by currently available exhaust aftertreatment systems. Accordingly, the subject matter of the present invention has been developed to provide an apparatus, system, and method for accurately estimating a $NO_x$ conversion efficiency (e.g., a maximum $NO_x$ conversion efficiency) of a selective catalytic reduction (SCR) catalyst.

According to one exemplary embodiment, an apparatus is disclosed for estimating an $NO_x$ conversion efficiency of an SCR catalyst, which in some implementations can be a maximum $NO_x$ conversion efficiency. The apparatus includes a catalyst degradation module for determining an SCR catalyst degradation factor. The apparatus further includes a $NO_x$ concentration module for determining an SCR catalyst inlet $NO_x$ concentration, which can be an SCR catalyst inlet $NO_2/NO_x$ concentration in some implementations, based on an interpretation of at least one $NO_x$ detector signal. Additionally, the apparatus includes a $NH_3$ concentration module for determining an SCR catalyst inlet $NH_3$ concentration. The apparatus further includes a temperature module for determining an SCR catalyst bed temperature of the at least one SCR catalyst. In some implementations, a space velocity (SV) module is provided for determining an exhaust gas SV for the SCR catalyst.

The apparatus further includes a $NO_x$ conversion efficiency module for calculating a $NO_x$ conversion efficiency value for the at least one SCR catalyst. The $NO_x$ conversion efficiency module calculates the $NO_x$ conversion efficiency value using the SCR catalyst degradation factor, the SCR catalyst inlet $NO_x$ concentration (e.g., the SCR catalyst inlet $NO_2/NO_x$ concentration in some instances), the SCR catalyst inlet $NH_3$ concentration, the exhaust gas SV, and the SCR catalyst bed temperature. In some implementations, the $NH_3$ concentration module is configured to determine an SCR catalyst outlet $NH_3$ slip concentration. The SCR catalyst outlet $NH_3$ slip concentration, as well as an $NH_3$ slip target, can also be used by the $NO_x$ conversion efficiency module in its determination of the $NO_x$ conversion efficiency value. In some instances, the $NH_3$ slip target is used for comparative analysis with the determined $NH_3$ slip concentration. The exhaust gas SV can be based at least partially on an exhaust gas mass flow rate, an exhaust gas density, and a volume of the at least one SCR catalyst. Further, in some instances, the SCR inlet $NO_x$ concentration is based at least partially on at least one chemical kinetics reaction formula, such as an Eley-Rideal mechanism. In certain implementations, various sensors and detectors are in communication with the apparatus providing signals that indicate temperatures of interest and the presence of specified exhaust gas molecular species and additives including $NO_2$, $NO_x$, and ammonia. The $NO_x$ conversion efficiency can be a maximum $NO_x$ conversion efficiency.

According to some implementations, the at least one SCR catalyst includes a first catalyst in series with a second catalyst. The at least one $NO_x$ detector can be positioned between the first and second SCR catalysts. Moreover, the SCR catalyst bed temperature can be determined by combining a weighted SCR catalyst inlet exhaust temperature signal from a first temperature detector and a weighted SCR catalyst outlet exhaust temperature signal from a second temperature detector. In some instances, the $NH_3$ signal is generated by at least one $NH_3$ detector that includes at least one of a dedicated $NH_3$ sensor and a combination $NO_x/NH_3$ sensor.

A method is disclosed for estimating a maximum $NO_x$ conversion efficiency of at least one selective catalytic reduction (SCR) catalyst. The method includes determining a SCR catalyst degradation factor and determining an exhaust gas space velocity for the SCR catalyst. Additionally, the method includes determining a $NO_x$ concentration and $NH_3$ concentration at an SCR catalyst inlet, and determining an SCR catalyst bed temperature. The method also includes calculating a maximum $NO_x$ conversion efficiency value for the SCR catalyst based at least partially on the SCR catalyst degradation factor, the exhaust gas space velocity, the SCR catalyst inlet $NO_x$ and $NH_3$ concentrations, and the SCR catalyst bed temperature. In some instances, the maximum $NO_x$ conversion efficiency value for the SCR catalyst is further based at least partially on a predetermined SCR catalyst outlet $NH_3$ slip target and a determined amount of $NH_3$ slip at an SCR catalyst outlet.

The method can include determining an SCR catalyst inlet $NO_2/NO_x$ concentration. The maximum $NO_x$ conversion efficiency value for the SCR catalyst can be calculated based at least partially on the $NO_2/NO_x$ concentration. The method can include communicating the maximum $NO_x$ conversion efficiency value to an aftertreatment system controller.

A system is disclosed for estimating a maximum conversion efficiency of a selective catalytic reduction catalyst. In certain implementations, the system includes an internal combustion engine that produces an exhaust gas stream. The system also includes an exhaust aftertreatment system in exhaust receiving communication with the internal combustion engine. The exhaust aftertreatment system can include at least one SCR catalyst, a diesel oxidation catalyst (DOC), a diesel particulate filter (DPF). Furthermore, the system includes strategically located temperature sensors, various $NO_x$ sensors, and at least one $NH_3$ sensor. The system can also include a reductant injector that injects the reductant into the exhaust gas stream upstream of the SCR catalyst and a reductant storage container in fluid communication with the reductant injector.

The system further includes a controller. The controller includes a catalyst degradation module, an exhaust space velocity module, a $NO_x$ concentration module, a temperature module, and a maximum $NO_x$ conversion efficiency module. The system may further include an ammonia oxidation (AMOX) catalyst for oxidizing excess ammonia slipping from the SCR catalyst. The catalytic sites within the SCR catalyst may use copper, iron, and/or vanadium. Further, the catalytic sites may be formed into a zeolite configuration.

In certain implementations, the at least one SCR catalyst includes a first SCR catalyst upstream of a second SCR catalyst. The first SCR catalyst can have a different $NO_x$ conversion efficiency than the second SCR catalyst. The system can further include first and second $NO_x$ sensors. The first $NO_x$ sensor can be positioned between the first and second SCR catalyst and the second $NO_x$ sensor can be positioned downstream of the second SCR catalyst. The first SCR catalyst can be one of a copper zeolite SCR catalyst, an iron zeolite SCR catalyst, and a vanadium SCR catalyst and the second SCR catalyst can be another of the copper zeolite SCR catalyst, iron zeolite SCR catalyst, and vanadium SCR catalyst.

In some implementations of the system, the exhaust aftertreatment system comprises an ammonia oxidation (AMOX) catalyst downstream of the at least one SCR catalyst. The controller can include an AMOX $NH_3$ conversion module configured to determine an AMOX $NH_3$ conversion capability. Correspondingly, the maximum $NO_x$ conversion efficiency value can be based at least partially on the AMOX $NH_3$ conversion capability.

According to another embodiment, a computer program product for estimating a maximum $NO_x$ conversion efficiency of a selective catalytic reduction (SCR) catalyst, when executed on a computer, causes the computer to determine a SCR catalyst degradation factor and an $NH_3$ slip target, determine SCR catalyst inlet $NO_x$ and $NH_3$ concentrations, determine an SCR catalyst inlet $NO_2/NO_x$ concentration, determine an exhaust gas space velocity for the SCR catalyst, determine an SCR catalyst bed temperature, and determine an amount of $NH_3$ slip at an SCR catalyst outlet. The computer program also causes the computer to calculate a maximum $NO_x$ conversion efficiency value for the SCR catalyst based at least partially on the SCR catalyst degradation factor, the SCR catalyst inlet $NO_x$ and $NH_3$ concentrations, the SCR catalyst inlet $NO_2/NO_x$ concentration, the exhaust gas SV, the SCR catalyst bed temperature, the $NH_3$ slip at the SCR catalyst outlet, and the $NH_3$ slip target.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
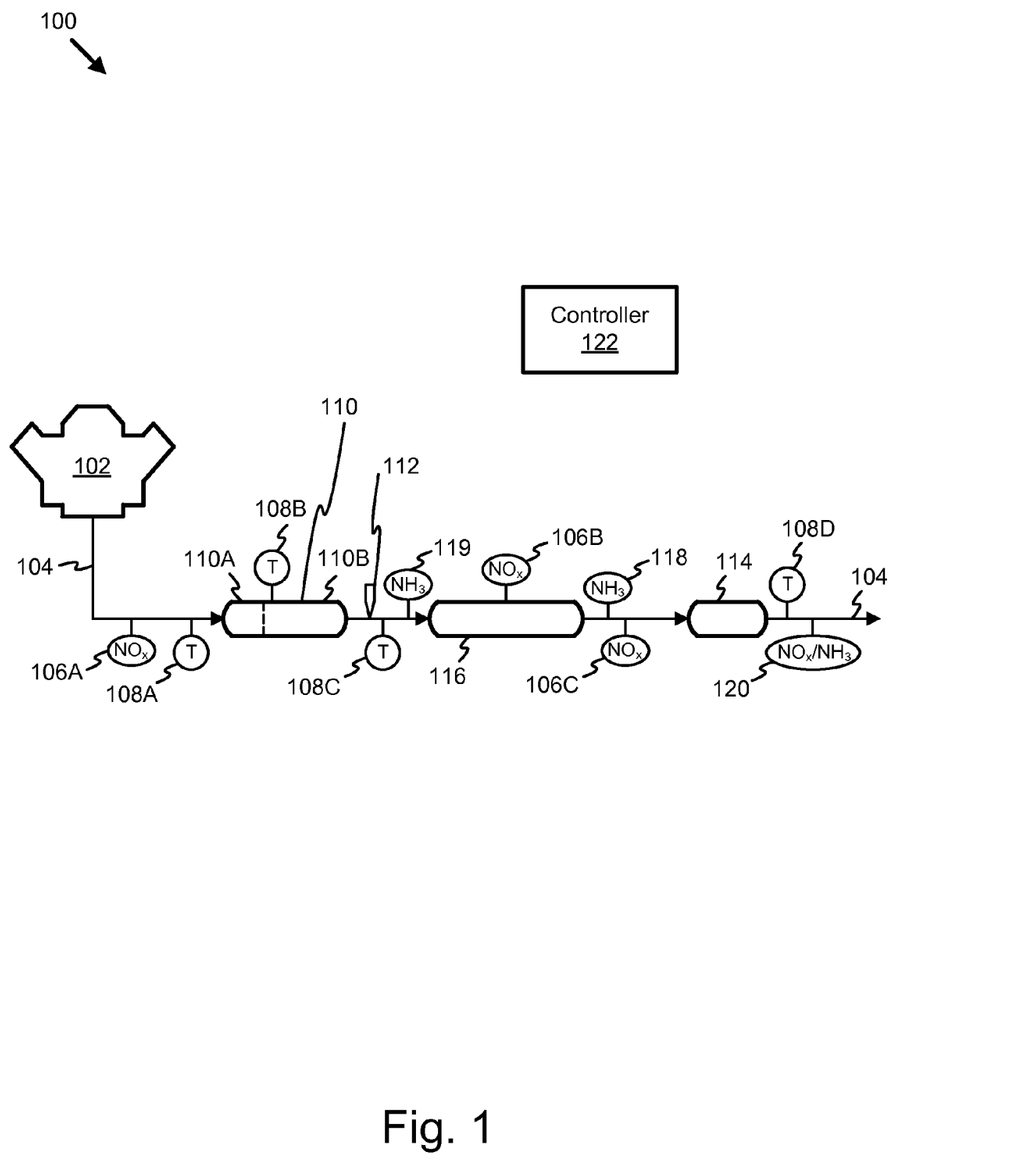
FIG. 1 is an illustrated diagram depicting one embodiment of a system for estimating the maximum $NO_x$ conversion efficiency of a selective catalytic reduction catalyst.

FIG. 1 is an illustrated diagram depicting one embodiment of a system 100 for estimating the maximum $NO_x$ conversion efficiency of a selective catalytic reduction (SCR) catalyst according to the present invention. As used herein, the maximum $NO_x$ conversion efficiency of an SCR catalyst is defined as the approximate highest $NO_x$ conversion efficiency of the SCR catalyst for a given capacity of the SCR catalyst. In other words, the maximum $NO_x$ conversion efficiency of an SCR catalyst is not necessarily the highest $NO_x$ conversion efficiency of the SCR catalyst at full capacity of the SCR catalyst. For example, if desired, the maximum $NO_x$ conversion efficiency of an SCR catalyst can represent the highest $NO_x$ conversion efficiency of the SCR catalyst at less-than-full capacity of the SCR catalyst, such as at 75% of full capacity.

The system 100 includes an internal combustion engine 102 producing an exhaust gas stream 104. The system 100 includes various $NO_x$ sensors 106A, 106B, 106C strategically placed to provide detection of amounts of $NO_x$ within the exhaust gas stream 104. For example, a $NO_x$ sensor 106A may be positioned upstream of a diesel particulate filter (DPF) 110 to provide an indication of $NO_x$ levels within the exhaust stream 104 prior to interaction with components of the exhaust gas aftertreatment treatment system.

The system 100 includes various temperature sensors 108A, 108B, 108C, 108D strategically position within the system 100. For example, a temperature sensor 108A may be position upstream of the DPF 110 to providing an indication of a temperature of the exhaust gas prior to interaction with components of the exhaust gas aftertreatment system. The DPF 110 is provided for removing particulate matter (PM) from the exhaust gas stream 104. In some embodiments, the DPF 110 may be regenerated using various methods including increasing the temperature of the exhaust gas stream 104, which may further include dosing fuel into the DPF 110 to provide thermal events that may increase temperature within the DPF 110 for oxidizing PM. In the depicted embodiment of system 100, a dual purpose DPF 110, or 'robust' particulate matter filter (PMF) 110, is provided comprising a diesel oxidation catalyst (DOC) portion 110A and a PMF portion 110B. The DOC portion 110A may provide periodic temperature increases to the exhaust stream 104 such that the filter portion 110B may periodically regenerate. In the depicted embodiment, a temperature sensor 108B may be disposed within the DPF 110 for monitoring temperature fluctuations within the DPF 110.

The system 100 further includes a reductant injector 112. The reductant injector 112 may be coupled to a reductant storage container (not shown). The reductant injector 112 may inject a reductant at specified times and in specified quantities into the exhaust stream 104. Furthermore, the quantity of reductant introduced into the exhaust gas stream 104 may be regulated such that a residue of reductant or 'reductant slip' from a tailpipe is reduced or eliminated. In some embodiments, the reductant injection requirement can be generated and modified as described in U.S. Provisional Patent Application No. 61/120,304, filed Dec. 5, 2008, which is incorporated herein by reference. In another contemplated embodiment, the system 100 may include an oxidation catalyst downstream of the reductant injector 112, such as an ammonia oxidation (AMOX) catalyst 114 as depicted in FIG. 1, wherein any residual reductant may be oxidized so as to eliminate reductant slip from the tailpipe. In one embodiment of the system 100, the reductant may be a urea that decomposes into various compounds, such as ammonia and isocyanic acid. In other contemplated embodiments, a purer form of ammonia may be introduced into the exhaust gas stream 104 as the reductant source.

A temperature sensor 108C upstream of a selective catalytic reduction (SCR) catalyst 116 is included in the system 100. Regulating the temperature of the exhaust gas stream 104 before entering the SCR catalyst 116 may assist in the $NO_x$ reducing reaction of the reductant within the SCR catalyst 116. The SCR catalyst 116 provides catalytic reaction 'sites' where the reductant reacts in various combinations with nitrogen oxides within the exhaust gas stream 104 producing more environmentally benign emissions. The SCR catalyst 106 may comprise catalytic sites composed of various elements including copper, iron, and/or vanadium, among others known in the art. Furthermore, the catalytic sites may be formed into a zeolite configuration where the surface area available for reactions may be significantly increased. A $NO_x$ sensor 106B may be disposed within the SCR catalyst 116 providing an indication of the $NO_x$ levels within the SCR catalyst 116.

The system 100 includes an ammonia sensor 118 located downstream of the SCR catalyst 116 to detect ammonia slipping from the SCR catalyst 116, an ammonia sensor 119 located upstream of the SCR catalyst to detect ammonia entering the SCR catalyst, and a $NO_x$ sensor 106C positioned downstream of the SCR catalyst 116 to detect levels of $NO_x$ remaining in the exhaust stream 104. In one embodiment, the system 100 includes a temperature sensor 108D downstream of the AMOX catalyst 114. Also, in the depicted embodiment, a combination $NO_x/NH_3$ sensor 120 may be implemented to determine any ammonia and/or $NO_x$ in the exhaust stream 104 that may escape from the tailpipe. In other contemplated embodiments, dedicated sensors may be implemented.

The system 100 further includes a controller 122 comprising modules configured to interpret signals from various components and sensors within the system 100. The controller 122 may further determine amounts of reductant to be injected, temperature thresholds to achieve, or control any of the various components of the system 100. The controller 122 may be an engine control module (ECM), configured within the ECM, in communication with the ECM, and/or in communication with other vehicle and/or service network datalinks. In operation, according to one example, the controller 122 may determine that a specified amount of reductant be injected by the reductant injector 112 into the exhaust gas stream 104 based on a $NO_x$ detection signal received from the $NO_x$ sensor 106A. The amount of reductant injected may be further modified by the controller 122 based on whether ammonia slippage is detected by ammonia sensors downstream of the SCR catalyst 116, such as ammonia sensors 118, 120, and/or whether the SCR catalyst 116 is capable of reacting with the reductant based on a determination of a $NO_x$ conversion efficiency of the SCR catalyst 116.

The $NO_x$ conversion efficiency of the SCR catalyst as defined herein can mean a maximum $NO_x$ conversion efficiency or, alternatively, a desired fraction of the maximum $NO_x$ conversion efficiency. Further, although the term maximum $NO_x$ conversion efficiency is used throughout, the apparatus, method, and system described herein can be used to determine any of various $NO_x$ conversion efficiencies, such as a current $NO_x$ conversion efficiency.

Other responses generated by the controller 122 may include causing the temperature of the exhaust stream to be adjusted, indicating maintenance requirements for components of the system 100, causing regeneration events of system 100 components to be initiated, and the like. The controller 122 may include a catalyst degradation module 304, a $NO_x$ concentration module 308, a space velocity module 312, a temperature module 316, an $NH_3$ concentration module 320, a maximum $NO_x$ conversion efficiency module 324, and an AMOX $NH_3$ conversion module 330 (see, e.g., FIG. 3). The various sensors and detectors of the system 100 may comprise any combination of real and virtual sensors.

Figure 2:
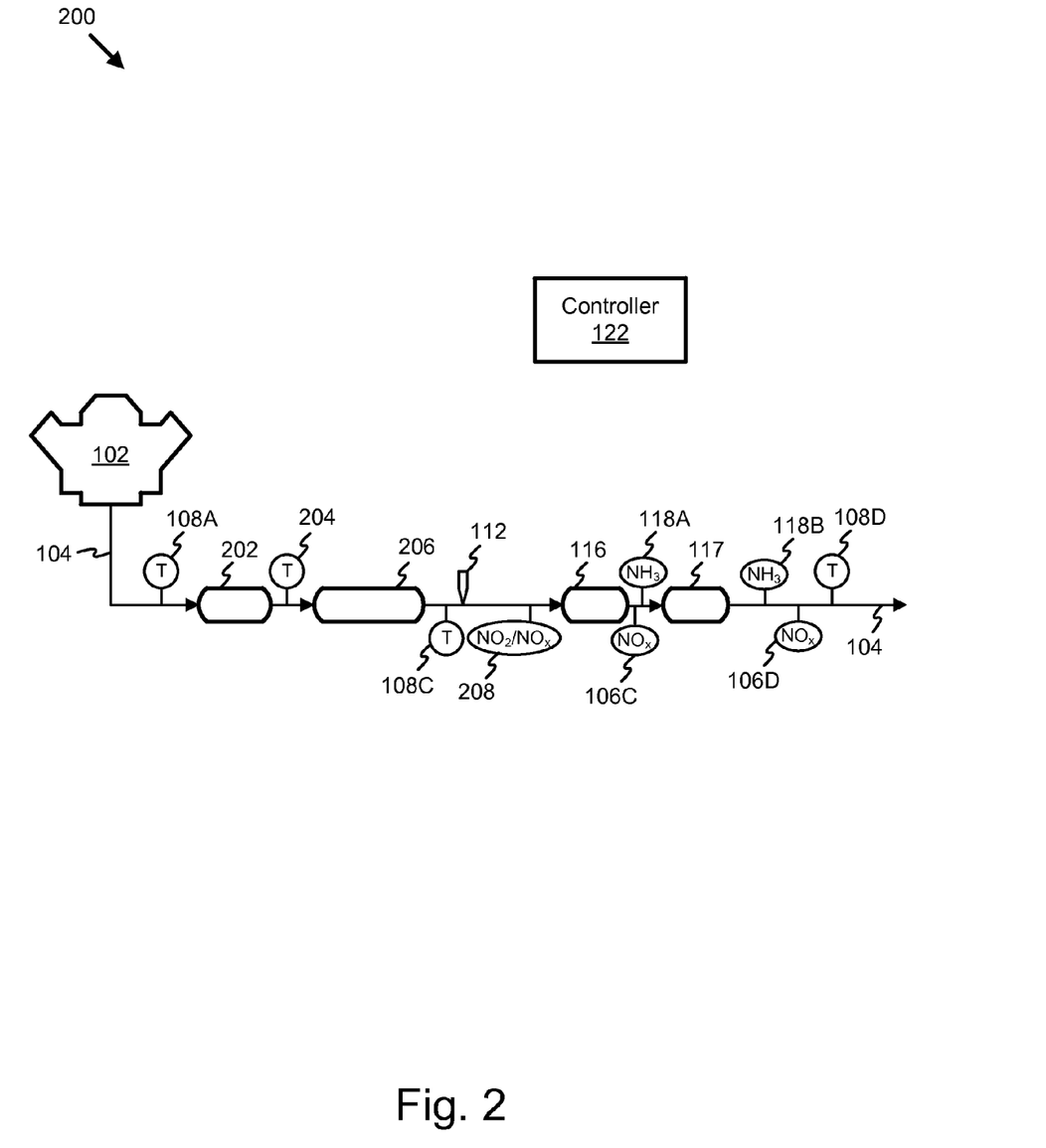
FIG. 2 is an illustrated diagram depicting an alternate embodiment of a system for estimating the maximum $NO_x$ conversion efficiency of a selective catalytic reduction catalyst.

FIG. 2 is an illustrated diagram depicting an alternate embodiment of a system 200 for estimating the maximum $NO_x$ conversion efficiency of a selective catalytic reduction catalyst according the present invention. The system 200 may include the combustion engine 102 producing the exhaust gas stream 104. The exhaust aftertreatment system coupled to the combustion engine 102 is similar to system 100 except the system 200 does not include an AMOX catalyst and the system 200 includes dual SCR catalysts 116, 117.

The first SCR catalyst 116 is upstream of the second SCR catalyst 117 and includes a catalyst bed of a first type. The second SCR catalyst 117 is downstream of the first SCR catalyst 116 and includes a catalyst bed of a second type. The first and second SCR catalysts 116, 117 operate to cooperatively reduce $NO_x$ emissions from the exhaust stream. For example, the catalyst bed of the first type can be configured to operate at a first higher bed temperature and the catalyst bed of the second type can be configured to operate at a second lower bed temperature. Generally, the first SCR catalyst 116 is configured to reduce a specific amount of $NO_x$ emissions from the exhaust gas stream and the second SCR catalyst 117 is configured to further reduce $NO_x$ emissions remaining in the exhaust gas stream after the first SCR catalyst 116. In one implementation, the first type of catalyst bed is an Fe-zeolite catalyst and the second type of catalyst bed is a Cu-zeolite catalyst. However, the first and second type of catalyst bed can be any of various catalysts know in the art.

Like system 100, the system 200 includes various sensors strategically placed within the system including a temperature sensor 204 located between a DOC 202 and a PMF 206, as well as temperature sensors 108A, 108C, 108D similar to temperature sensors 108A, 108C, 108D of system 100. In the depicted embodiment, a combination $NO_2/NO_x$ sensor 208 is provided upstream of the first SCR catalyst 116. In some embodiments, one or more combination $NO_2/NO_x$ sensors, such as sensor 208, can be position between the first and second SCR catalysts 116, 117 and/or downstream of the second SCR catalyst 117. Further, the system 200 includes an $NH_3$ sensor 118A and a $NO_x$ sensor 106C positioned between the first and second SCR catalysts 116, 117. Similarly, the system 200 includes an $NH_3$ sensor 118B and a $NO_x$ sensor 106D positioned downstream of the second SCR catalyst 117. In some instances, the system 100 includes only the $NH_3$ sensor 118B and the $NO_x$ sensor 106D.

Figure 3:
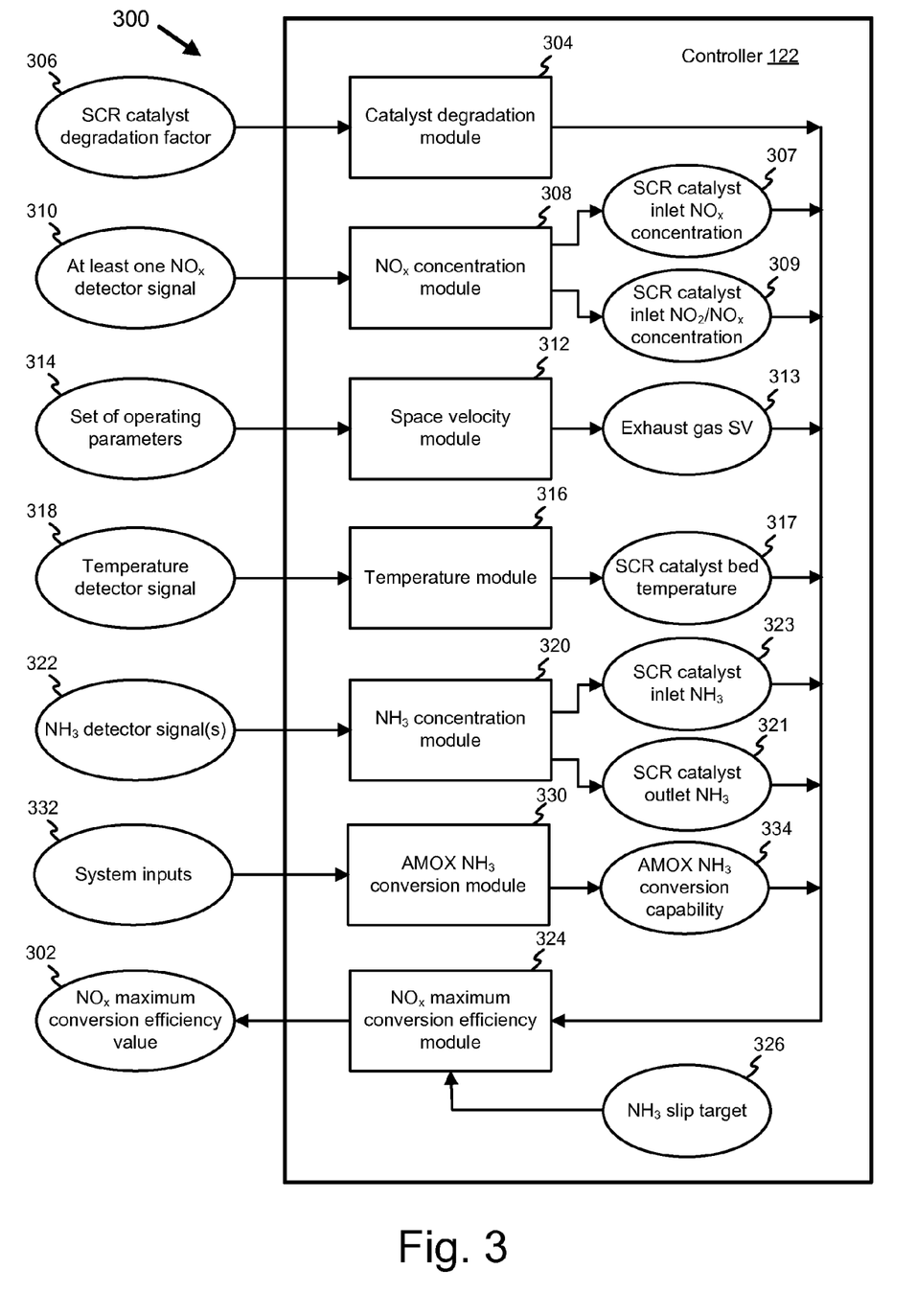
FIG. 3 is an illustrated block diagram depicting one embodiment of an apparatus for estimating a maximum $NO_x$ conversion efficiency value.

FIG. 3 is an illustrated block diagram depicting one embodiment of an apparatus 300 for estimating a maximum $NO_x$ conversion efficiency value 302 in accordance with the present invention. The apparatus 300 includes a controller 122 having a catalyst degradation module 304 configured to determine an SCR catalyst degradation factor 306. The SCR catalyst degradation factor 306 provides an indication of the degradation of the SCR catalyst 116 over time. In certain implementations, the degradation factor indicates the amount the SCR catalyst 116 has degraded over time in comparison to the SCR catalyst when fresh or new. Therefore, the SCR degradation factor can be expressed as a percentage of new, a ratio of the current SCR catalyst condition to the condition of a new SCR catalyst, a ratio of the $NO_x$ conversion efficiency of a degraded SCR catalyst to the $NO_x$ conversion efficiency of a fresh SCR catalyst at a given standard operating condition of the engine system, a ratio of the $NH_3$ storage capacity of a degraded SCR catalyst to the $NH_3$ storage capacity of a fresh SCR catalyst at a given standard operating condition of the engine system, or a normalized value between zero and one with one being zero degradation and zero being a completely degraded catalyst.

In one embodiment, the SCR degradation factor 306 may be updated from a model that predicts the SCR degradation, such as any of various SCR catalyst degradation models known in the art. In one embodiment, the SCR degradation factor 306 is predicted as described in U.S. Provisional Patent Application No. 61/120,283, filed Dec. 5, 2008, which is incorporated herein by reference. Alternatively, or additionally, in some embodiments, the SCR degradation factor 306 may be determined based on tracking and/or interpreting one or more performance and operating factors related to the SCR catalyst 116, such as described in U.S. Patent Application No. 61/120,283 as well. The factors can include, for example, a conversion efficiency of specified molecular species, exhaust flow velocity through the SCR catalyst 116, ambient operating conditions, a cumulative number of duty cycles of the SCR 116, a distance a vehicle coupled to the SCR catalyst 116 travels, a cumulative time the SCR catalyst 116 is in operation, a number of instances that an SCR catalyst bed temperature exceeds a threshold, a detected ammonia slip at the SCR catalyst outlet compared to an amount of SCR catalyst inlet ammonia and the SCR catalyst bed temperature, a detected ammonia slip at the SCR catalyst outlet compared to an amount of SCR catalyst inlet isocyanic acid and the SCR catalyst bed temperature, and the like.

In one specific implementation, the SCR catalyst degradation factor 306 is a function of a detected amount of $NH_3$ exiting the SCR catalyst compared with a detected amount of $NH_3$ entering the SCR catalyst and/or the temperature of the SCR catalyst bed. The amount of $NH_3$ exiting the SCR catalyst can be detected by a physical sensor positioned proximate the outlet of the SCR catalyst. For applications without an SCR catalyst outlet $NH_3$ sensor, the amount of $NH_3$ exiting the SCR catalyst can be estimated by comparing the rate of change of $NO_x$ at the SCR outlet with the rate of injection of urea into the exhaust stream entering the SCR catalyst.

The controller 122 includes a $NO_x$ concentration module 308 configured to interpret a $NO_x$ detector signal 310. The $NO_x$ detector signal 310 may be generated by at least one $NO_x$ sensor, such as $NO_x$ sensor 106A. The $NO_x$ concentration module 308 may determine an SCR catalyst inlet $NO_x$ concentration 307 within the exhaust gas stream 104 based at least partially on the $NO_x$ detector signal 310. In alternative embodiments, the $NO_x$ sensor may comprise a combination $NO_2/NO_x$ sensor and/or a dedicated $NO_2$ sensor and $NO_x$ sensor. The $NO_x$ concentration module 308 also determines an SCR catalyst inlet $NO_2/NO_x$ concentration 309. In one embodiment, the determination of the SCR inlet $NO_2/NO_x$ concentration 309, as well as the inlet $NO_x$ concentration 307, may be calculated using a chemical kinetics reaction formula known in the art. For example, in one implementation, the chemical kinetics reaction formula is based on an Eley-Rideal mechanism commonly known in the art. In further contemplated embodiments, the $NO_x$ concentration module 308 may also be configured to determine various $NO_x$ concentrations within the exhaust stream 104 downstream of the SCR catalyst 116. In some embodiments, the $NO_x$ signal received from a $NO_x$ sensor can be corrected as described in U.S. Provisional Patent Application No. 61/120,319, filed Dec. 5, 2008, which is incorporated herein by reference.

The controller 122 further includes a space velocity module 312 configured to determine (e.g., by interpreting a sensor signal) a set of operating parameters 314 whereby the exhaust gas space velocity (SV) 313 of the exhaust stream may be determined. For example, the exhaust gas SV 313 for the SCR catalyst 116 may be determined from various selected factors, such as, for example, a volume of the SCR catalyst 116, a temperature of the exhaust flow 104, an intake air flow, an exhaust gas mass flow rate, an exhaust gas density, an engine speed, an ambient temperature, a fueling rate, and the like.

Additionally, the controller 122 includes a temperature module 316 configured to interpret a temperature detector signal 318. The temperature detector signal 318 may be one or more signals. In one example, the temperature detector signal 318 may indicate a temperature at a specified location of the exhaust stream 104. In another example, temperature sensors 108 may provide at least one temperature detector signal 318 for interpretation by the temperature module 316 to determine an SCR catalyst bed temperature 317. In one embodiment, the temperature module 316 may determine the SCR catalyst bed temperature 317 by combining a weighted SCR catalyst inlet exhaust temperature signal from a first temperature detector or signal 108A with a weighted SCR catalyst outlet exhaust temperature signal from a second temperature detector or signal 108C. Simple experimentation may determine the specific weights applicable for the inlet and outlet temperature signals to determine an accurate estimate of the catalyst bed temperature 317 for a particular embodiment of the present invention.

The controller 122 also has an $NH_3$ concentration module 320 configured to interpret one or more $NH_3$ detector signals 322 and generate an estimate of SCR catalyst outlet $NH_3$ 321 ($NH_3$ slip out of the SCR catalyst 116) and SCR catalyst inlet $NH_3$ 323 based at least partially on the $NH_3$ detector signal 322. In certain embodiments, the $NH_3$ concentration module 320 is the same as or similar to the SCR catalyst ammonia slip module described in U.S. patent application Ser. No. 12/112,678, filed Apr. 30, 2008, which is incorporated herein by reference. The $NH_3$ detector signal(s) 322 may be generated from the SCR catalyst outlet $NH_3$ sensor 118 and/or SCR catalyst inlet $NH_3$ sensor 119. In one embodiment, the $NH_3$ detector signal 322 may be a combination $NO_x/NH_3$ signal communicated from one or more combination $NO_x/NH_3$ sensors, such as sensor 120. In such an embodiment, the $NH_3$ concentration module 320 is configured to mathematically decompose the combination $NO_x/NH_3$ signal to determine the portion(s) of the combination signal that represents the SCR catalyst outlet and inlet $NH_3$ values. In some implementations, the SCR catalyst inlet $NH_3$ can be predicted based on the current reductant dosing rate in a manner similar to that described in U.S. patent application Ser. No. 12/112,678.

Referring again to FIG. 3, the controller 122 includes a maximum $NO_x$ conversion efficiency module 324 configured to determine the maximum $NO_x$ conversion efficiency value 302 for the SCR catalyst 116. In one embodiment, the calculated maximum $NO_x$ conversion efficiency value 302 is based on the SCR catalyst degradation factor 306, the SCR catalyst inlet $NO_x$ concentration 307 determined by the $NO_x$ concentration module 308, the SCR catalyst inlet $NO_2/NO_x$ concentration 309 determined by the $NO_x$ concentration module 308, the exhaust gas SV 313 for the SCR catalyst determined by the space velocity module 312, the SCR catalyst bed temperature 317 as determined by the temperature module 316, the $NH_3$ slip 321 at the SCR catalyst outlet as determined by the $NH_3$ concentration module 320, the SCR catalyst inlet $NH_3$ 323 as determined by the $NH_3$ concentration module 320, and an $NH_3$ slip target 326. In some implementations, the maximum $NO_x$ conversion efficiency value 302 is based on less than all of the above inputs. For example, in one implementation, the maximum $NO_x$ conversion efficiency value 302 is determined based on just the SCR catalyst degradation factor 306, SCR catalyst inlet $NO_x$ concentration 307, the exhaust gas SV 313, SCR catalyst bed temperature 317, and SCR catalyst inlet $NH_3$ 323.

The $NH_3$ slip target 326 may be determined for a desired engine system from one or more specifications. The specifications can include, for example, an SCR catalyst manufacturer's ammonia slip specification, an experimentally determined slip target, a government legislated amount of allowable ammonia slip, a given allowable ammonia slip for a given configuration of engine and operating conditions, and the like. Generally, the $NH_3$ slip target 326 represents a specified or desired $NH_3$ slip target for a fresh SCR catalyst operating under prescribed operating conditions. The maximum $NO_x$ conversion efficiency module 324 utilizes the slip target 326 in any of various ways in its determination of the maximum $NO_x$ conversion efficiency value 302. For example, the maximum $NO_x$ conversion efficiency module 324 may adjust the maximum $NO_x$ conversion efficiency value 302 based on a calculated a difference between the determined $NH_3$ slip 321 from the SCR catalyst and the $NH_3$ slip target 326.

In some embodiments having an AMOX catalyst, the controller 122 includes an AMOX $NH_3$ conversion module 330 that determines an AMOX $NH_3$ conversion capability 334 of the AMOX catalyst (e.g., catalyst 114) based on various system inputs 332. In certain embodiments, the AMOX $NH_3$ conversion module 330 and system inputs 332 are the same as or similar to the AMOX $NH_3$ conversion module and associated system inputs described in U.S. patent application Ser. No. 12/112,500, filed Apr. 30, 2008, which is incorporated herein by reference. The AMOX $NH_3$ conversion capability 334 can be utilized by the maximum $NO_x$ conversion efficiency module 324 to determine the maximum $NO_x$ conversion efficiency value 302. For example, as the AMOX $NH_3$ conversion capability 334 increases, the maximum $NO_x$ conversion efficiency module 324 can be configured to correspondingly increase the maximum $NO_x$ conversion efficiency value 302.

The schematic flow chart diagrams that follow, as well as the preceding method schematic diagram, are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
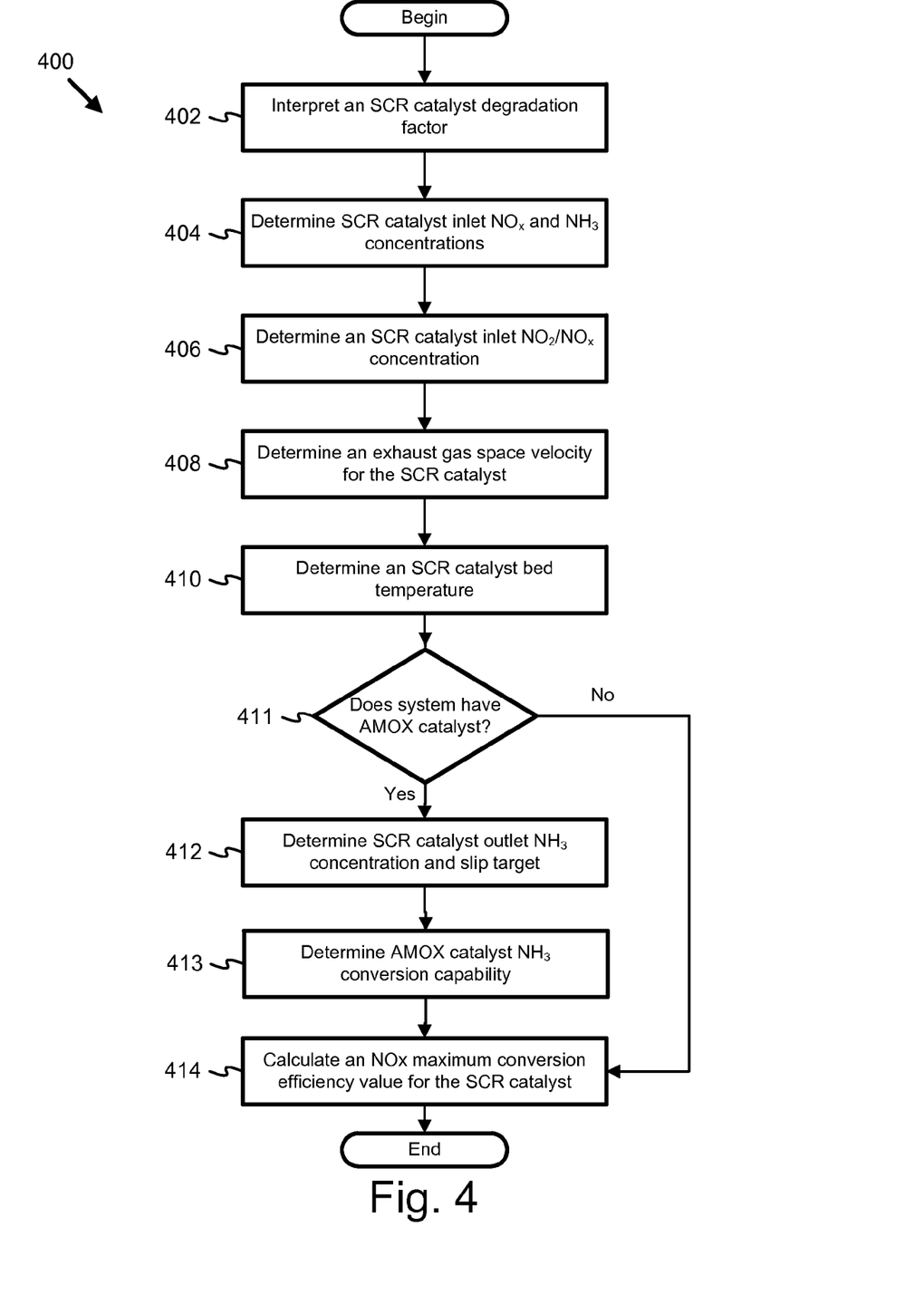
FIG. 4 is a flow chart block diagram illustrating one embodiment of a method for determining a maximum $NO_x$ conversion efficiency value.

FIG. 4 is a flow chart block diagram illustrating one embodiment of a method 400 for determining a maximum conversion efficiency value in accordance with the present invention. The method 400 begins with the SCR catalyst degradation module determining 402 an SCR catalyst degradation factor, such as SCR catalyst degradation factor 306. The method 400 proceeds with the $NO_x$ concentration module determining 404 SCR catalyst inlet $NO_x$ and $NH_3$ concentrations, such as SCR catalyst inlet $NO_x$ concentration 307, and the $NO_x$ concentration module determining 406 an SCR catalyst inlet $NO_2/NO_x$ concentration, such as SCR catalyst inlet $NO_2/NO_x$ concentration 309. The method 400 continues with the space velocity module determining 408 an exhaust gas space velocity for the SCR catalyst, such as, exhaust gas SV 313, and the temperature module determining 410 an SCR catalyst bed temperature, such as SCR catalyst bed temperature 317.

The method 400 then determines 411 whether the exhaust aftertreatment system includes an AMOX catalyst. If the aftertreatment system does not include an AMOX catalyst, the method 400 proceeds to calculate 414 an $NO_x$ maximum conversion efficiency value for the SCR catalyst based on some or all of the parameters determined in steps 402-410. If, however, the aftertreatment system does indeed have an AMOX catalyst, the method 400 proceeds to determine 412 an amount of $NH_3$ slip at an SCR catalyst outlet, such as SCR catalyst outlet $NH_3$ 321, and an SCR catalyst $NH_3$ slip target, such as $NH_3$ slip target 326, and determine 413 an AMOX catalyst $NH_3$ conversion capability, such as $NH_3$ conversion capability 334. After steps 412, 413, the method 400 proceeds to determine 414 a maximum $NO_x$ conversion efficiency value for the SCR catalyst, such as the maximum $NO_x$ conversion efficiency value 302, based on at least some of the parameters determined in steps 402-410 and at least some of the parameters determined in steps 412, 413. The maximum $NO_x$ conversion efficiency value 302 may be provided to an aftertreatment system controller. For example, the maximum $NO_x$ conversion efficiency value 302 may be utilized by a $NO_x$ reduction target module, such as described in U.S. patent application Ser. No. 12/112,795, filed Apr. 30, 2008, which is incorporated herein by reference.

The present invention may be embodied in other specific forms without departing from its spirit or essential characteristics. For example, various specific embodiments of the disclosed apparatus, system, and method are described in the several appended claims below. The embodiments described above and in the following claims are to be considered in all respects only as illustrative and not restrictive.

Several specific embodiments of the apparatus, system, and method of the present disclosure are defined according to the following appended claims:

Several specific embodiments of the apparatus, system, and method of the present disclosure are defined according to the follow appended claims:

1. An apparatus for estimating an $NO_x$ conversion efficiency of at least one selective catalytic reduction (SCR) catalyst, the apparatus comprising:
    a catalyst degradation module configured to determine an SCR catalyst degradation factor associated with the at least one SCR catalyst;
    an $NO_x$ concentration module configured to determine an SCR catalyst inlet $NO_x$ concentration;
    an $NH_3$ concentration module configured to determine an SCR catalyst inlet $NH_3$ concentration;
    a space velocity (SV) module configured to determine an exhaust gas SV for the SCR catalyst based at least partially on a set of operating parameters;
    a temperature module configured to determine an SCR catalyst bed temperature; and
    a $NO_x$ conversion efficiency module configured to calculate a $NO_x$ conversion efficiency value for the at least one SCR catalyst based at least partially on the SCR catalyst degradation factor, the SCR catalyst inlet $NO_x$ concentration, the SCR catalyst inlet $NH_3$ concentration, the exhaust gas SV, and the SCR catalyst bed temperature.

2. The apparatus of claim 1, wherein the $NO_x$ concentration module is configured to determine an SCR catalyst inlet $NO_2/NO_x$ concentration based at least partially on the interpretation of at least one $NO_x$ detector signal, and wherein the calculation of the $NO_x$ conversion efficiency value is based at least partially on the SCR catalyst inlet $NO_2/NO_x$ concentration.

3. The apparatus of claim 1, wherein the $NH_3$ concentration module is configured to determine an amount of $NH_3$ slip at an SCR catalyst outlet based at least partially on an interpretation of an $NH_3$ detector signal, wherein the $NO_x$ conversion efficiency value for the at least one SCR catalyst is based at least partially on the $NH_3$ slip at the SCR catalyst outlet.

4. The apparatus of claim 1, wherein the set of operating parameters comprises an exhaust gas mass flow rate, an exhaust gas density, and a volume of the at least one SCR catalyst.

5. The apparatus of claim 1, wherein the calculation of the $NO_x$ conversion efficiency value is based at least partially on an $NH_3$ slip target.

6. The apparatus of claim 1, wherein the determination of the SCR inlet $NO_x$ concentration is based at least partially on at least one chemical kinetics reaction formula.

7. The apparatus of claim 1, wherein the at least one $NO_x$ detector comprises at least one of a $NO_x$ sensor, an $NO_2$ sensor, and a combination $NO_2/NO_x$ sensor, the at least one $NO_x$ detector being positioned in at least one location selected from the group consisting of proximal to the SCR catalyst inlet, upstream of the SCR catalyst inlet, disposed within the SCR catalyst.

8. The apparatus of claim 1, wherein the at least one SCR catalyst comprises a first catalyst in series with a second catalyst, and wherein the at least one $NO_x$ detector is positioned between the first and second SCR catalysts.

9. The apparatus of claim 1, wherein the SCR catalyst bed temperature is determined by combining a weighted SCR catalyst inlet exhaust temperature signal from a first temperature detector and a weighted SCR catalyst outlet exhaust temperature signal from a second temperature detector.

10. The apparatus of claim 1, wherein the $NH_3$ signal is generated by at least one $NH_3$ detector comprising at least one of a dedicated $NH_3$ sensor and a combination $NO_x/NH_3$ sensor.

11. A method for estimating a maximum $NO_x$ conversion efficiency of a selective catalytic reduction (SCR) catalyst, the method comprising:
    determining an SCR catalyst degradation factor;
    determining a space velocity of exhaust entering the SCR catalyst;
    determining an SCR catalyst inlet $NO_x$ concentration;
    determining an SCR catalyst inlet $NH_3$ concentration;
    determining an SCR catalyst bed temperature; and
    calculating a maximum $NO_x$ conversion efficiency value for the SCR catalyst based at least partially on the SCR catalyst degradation factor, the space velocity of exhaust entering the SCR catalyst, the SCR catalyst inlet $NO_x$ concentration, the SCR catalyst inlet $NH_3$ concentration, and the SCR catalyst bed temperature.

12. The method of claim 11, further comprising determining an SCR catalyst inlet $NO_2/NO_x$ concentration, wherein the maximum $NO_x$ conversion efficiency value for the SCR catalyst is calculated based at least partially on the $NO_2/NO_x$ concentration.

13. The method of claim 11, further comprising determining a conversion capability of an AMOX catalyst downstream of the SCR catalyst, wherein the maximum $NO_x$ conversion efficiency value for the SCR catalyst is calculated based at least partially on the conversion capability of the AMOX catalyst.

14. The method of claim 11, further comprising communicating the maximum $NO_x$ conversion efficiency value to an aftertreatment system controller.

15. The method of claim 11, wherein the maximum $NO_x$ conversion efficiency value for the SCR catalyst is calculated based at least partially on a predetermined SCR catalyst outlet $NH_3$ slip target.

16. The method of claim 11, further comprising determining an amount of $NH_3$ slip at an SCR catalyst outlet, wherein the maximum $NO_x$ conversion efficiency value for the SCR catalyst is calculated based at least partially on the $NH_3$ slip at the SCR catalyst outlet.

17. A system for estimating a maximum $NO_x$ conversion efficiency of a selective catalytic reduction (SCR) catalyst, the system comprising:
- an internal combustion engine producing an exhaust gas stream;
- an exhaust aftertreatment system in exhaust receiving communication with the internal combustion engine, the exhaust aftertreatment system comprising at least one SCR catalyst; and
- a controller comprising:
  - a catalyst degradation module configured to determine an SCR catalyst degradation factor;
  - an $NO_x$ concentration module configured to determine an SCR catalyst inlet $NO_x$ concentration;
  - an $NH_3$ concentration module configured to determine an SCR catalyst inlet $NH_3$ concentration;
  - a temperature module configured to determine an SCR catalyst bed temperature;
  - a space velocity (SV) module configured to determine an exhaust gas SV for the SCR catalyst; and
  - a maximum $NO_x$ conversion efficiency module configured to calculate a maximum $NO_x$ conversion efficiency value for the at least one SCR catalyst based at least partially on the SCR catalyst degradation factor, the SCR catalyst inlet $NO_x$ concentration, the SCR catalyst inlet $NH_3$ concentration, the SCR catalyst bed temperature, and the exhaust gas SV.

18. The system of claim 17, wherein the at least one SCR catalyst comprises a first SCR catalyst upstream of a second SCR catalyst, the first SCR catalyst having a different $NO_x$ conversion efficiency than the second SCR catalyst.

19. The system of claim 18, further comprising first and second $NO_x$ sensors, the first $NO_x$ sensor being position between the first and second SCR catalyst and the second $NO_x$ sensor being position downstream of the second SCR catalyst.

20. The system of claim 18, wherein the first SCR catalyst comprises one of a copper zeolite SCR catalyst, an iron zeolite SCR catalyst, and a vanadium SCR catalyst and the second SCR catalyst comprises another of the copper zeolite SCR catalyst, iron zeolite SCR catalyst, and vanadium SCR catalyst.

21. The system of claim 17, wherein the exhaust aftertreatment system comprises an ammonia oxidation (AMOX) catalyst downstream of the at least one SCR catalyst, wherein the controller comprises an AMOX $NH_3$ conversion module configured to determine an AMOX $NH_3$ conversion capability, wherein the $NH_3$ concentration module is configured to determine an SCR outlet $NH_3$ concentration, and wherein the maximum $NO_x$ conversion efficiency value is based at least partially on the AMOX $NH_3$ conversion capability, the SCR outlet $NH_3$ concentration, and an $NH_3$ slip target.

22. A computer program product stored on one or more non-transitory machine readable storage media for estimating a maximum $NO_x$ conversion efficiency of a selective catalytic reduction (SCR) catalyst, wherein the computer readable program when executed on a computer causes the computer to:
- determine a SCR catalyst degradation factor and an $NH_3$ slip target;
- determine an SCR catalyst inlet $NO_x$ concentration and an SCR catalyst inlet $NO_2/NO_x$ concentration;
- determine an SCR catalyst inlet $NH_3$ concentration;
- determine an exhaust gas space velocity for the SCR catalyst;
- determine an SCR catalyst bed temperature determine an AMOX conversion capability;
- determine an amount of $NH_3$ slip at an SCR catalyst outlet; and
- calculate a maximum $NO_x$ conversion efficiency value for the SCR catalyst based at least partially on the SCR catalyst degradation factor, the SCR catalyst inlet $NO_x$ concentration, the SCR catalyst inlet $NO_2/NO_x$ concentration, the exhaust gas SV, the SCR catalyst bed temperature, the $NH_3$ slip at the SCR catalyst outlet, the AMOX conversion capability, and the $NH_3$ slip target.

* * * * *